United States Patent
Natuzzi

(10) Patent No.: US 10,154,730 B2
(45) Date of Patent: Dec. 18, 2018

(54) CONVERTIBLE SEATING AND DINETTE ARRANGEMENT

(71) Applicant: Triple E Canada, Ltd., Winkler (CA)

(72) Inventor: Angelo Natuzzi, Winkler, MN (US)

(73) Assignee: Triple E Canada, Ltd., Winkler (CA)

(\*) Notice: Subject to any disclaimer, the term of this patent is extended or adjusted under 35 U.S.C. 154(b) by 271 days.

(21) Appl. No.: 14/825,740

(22) Filed: Aug. 13, 2015

(65) Prior Publication Data

US 2016/0051047 A1 Feb. 25, 2016

Related U.S. Application Data

(60) Provisional application No. 62/130,727, filed on Mar. 10, 2015, provisional application No. 62/039,720, filed on Aug. 20, 2014.

(51) Int. Cl.

| | |
|---|---|
| *A47B 85/04* | (2006.01) |
| *B60N 2/75* | (2018.01) |
| *A47B 5/04* | (2006.01) |
| *A47B 5/06* | (2006.01) |
| *A47C 13/00* | (2006.01) |
| *A47C 17/16* | (2006.01) |
| *A47B 83/02* | (2006.01) |
| *B60P 3/36* | (2006.01) |
| *B60N 3/00* | (2006.01) |
| *B60N 2/005* | (2006.01) |

(Continued)

(52) U.S. Cl.
CPC .............. *A47B 85/04* (2013.01); *A47B 5/04* (2013.01); *A47B 5/06* (2013.01); *A47B 83/02* (2013.01); *A47C 13/00* (2013.01); *A47C 17/16* (2013.01); *B60N 2/005* (2013.01); *B60N 2/01* (2013.01); *B60N 2/0292* (2013.01); *B60N 2/14* (2013.01); *B60N 2/75* (2018.02); *B60N 3/001* (2013.01); *B60P 3/36* (2013.01); *B60N 2002/022* (2013.01); *B60N 2002/0288* (2013.01); *B60N 2205/35* (2013.01)

(58) Field of Classification Search
CPC .......... A47B 850/04; A47B 5/04; A47B 5/06; A47B 83/02; B60N 2/75; B60N 2/005; B60N 2/01; B60N 2/0292; B60N 2/14; B60N 3/001; A47C 13/00; A47C 17/16; B60P 3/36
USPC .......... 297/63–66, 118.119, 141, 147, 157.1, 297/158.2, 13, 241, 246; 108/169, 38, 108/39, 40; 296/65.13–65.15, 65.07, 296/65.06, 65.08
See application file for complete search history.

(56) References Cited

U.S. PATENT DOCUMENTS

| | | | |
|---|---|---|---|
| 817,596 A * | 4/1906 | Siebenthal | A47B 5/06 108/48 |
| 1,385,317 A * | 7/1921 | Dyer | B60N 2/34 297/423.27 |

(Continued)

*Primary Examiner* — Syed A Islam
(74) *Attorney, Agent, or Firm* — Faegre Baker Daniels LLP

(57) ABSTRACT

A convertible seating and dinette arrangement that includes moveable and adjustable first and second seats with each seat including a base, a seat bottom, and a backrest; and wherein each base is configured for pivotal movement to adjust between various modes. The convertible seating and dinette arrangement can include seats that are moveable and convertible to at least three different modes including a sofa mode, a recliner mode, a daybed mode, a dinette mode, an alternate dinette mode, and a chaise lounge mode.

15 Claims, 20 Drawing Sheets

(51) Int. Cl.
 *B60N 2/01* (2006.01)
 *B60N 2/02* (2006.01)
 *B60N 2/14* (2006.01)

(56) References Cited

U.S. PATENT DOCUMENTS

| | | | | |
|---|---|---|---|---|
| 2,777,742 | A | * | 1/1957 | Schieber .................. A47B 3/08 108/169 |
| 3,866,547 | A | * | 2/1975 | Guyton .................... A47B 5/06 108/38 |
| 4,815,785 | A | * | 3/1989 | Goodall .................. A61G 3/06 248/299.1 |
| 4,862,611 | A | * | 9/1989 | Wright .................... D06F 81/06 108/38 |
| 5,088,135 | A | * | 2/1992 | Violette ................. A47C 17/34 297/146 |
| 6,441,576 | B1 | * | 8/2002 | Marin-Martinod .......................... B60N 2/0232 297/327 |

* cited by examiner

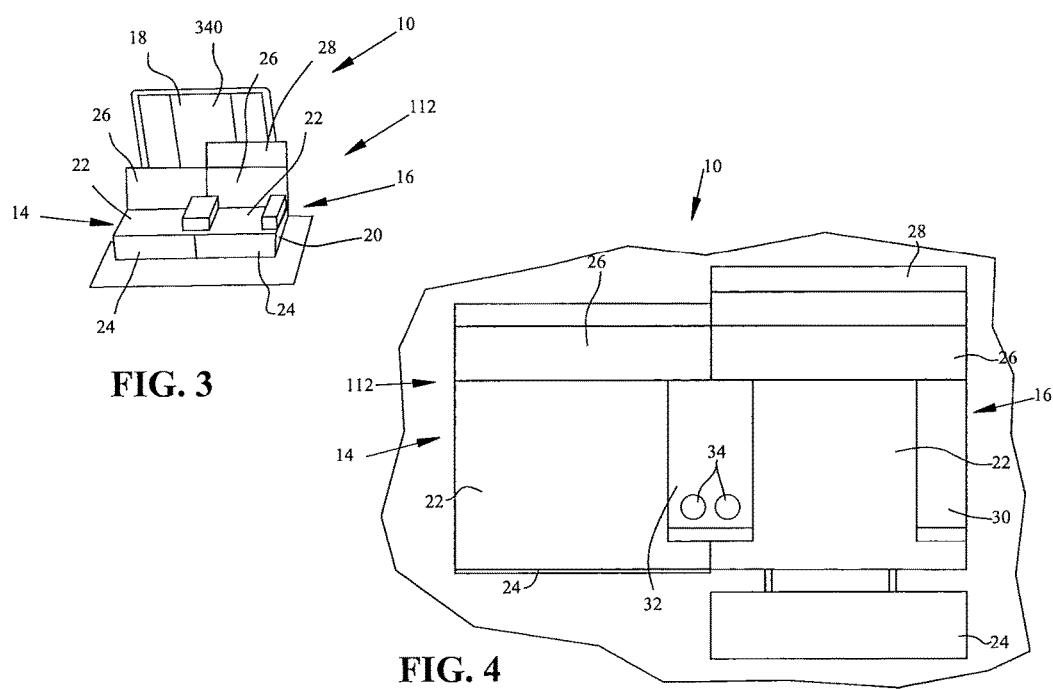

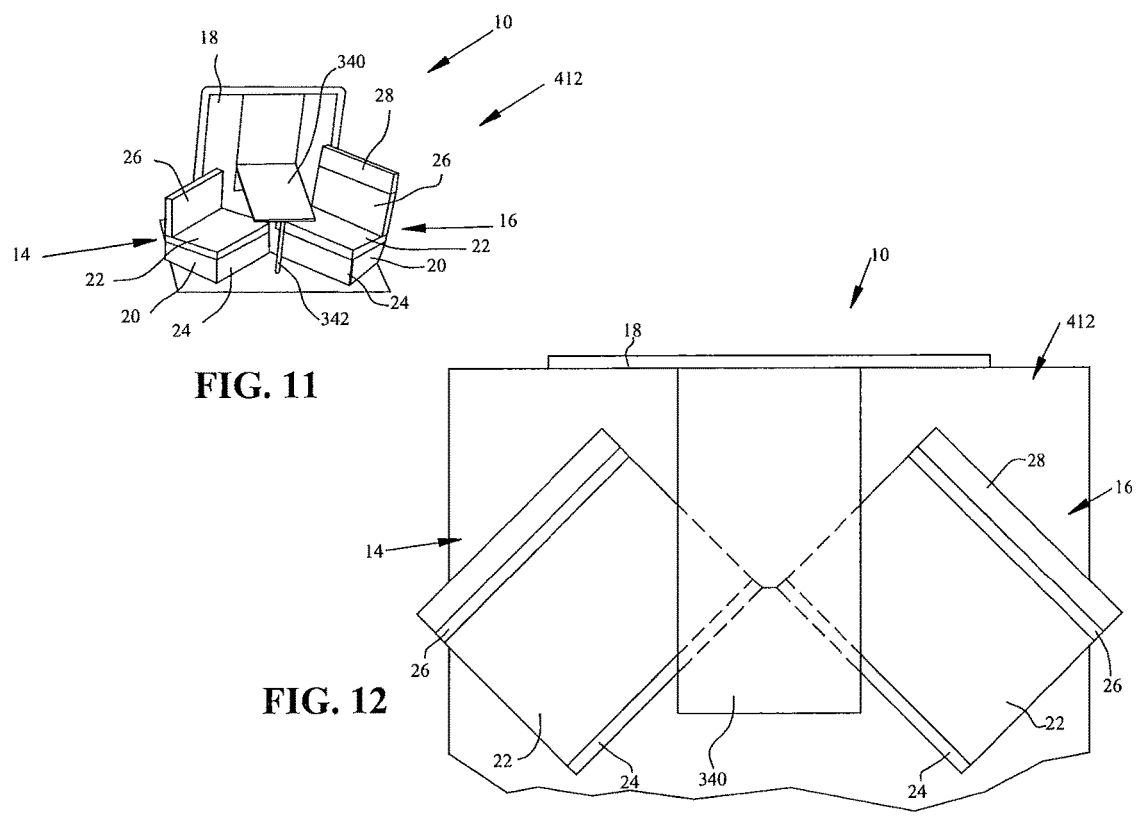

CONVERTIBLE SEATING AND DINETTE ARRANGEMENT

This application claims priority from and the benefit of U.S. Provisional Patent Application Ser. No. 62/130,727, filed Mar. 10, 2015 and the benefit of U.S. Provisional Patent Application Ser. No. 62/039,720, filed on Aug. 20, 2014, the complete disclosures for both applications being incorporated herein by reference.

BACKGROUND OF THE INVENTION

The subject invention relates to a convertible seating and dining arrangement, and in particular, to a convertible seating and dining arrangement capable of moving between at least three modes. The modes may include a sofa mode, a recliner mode, a daybed mode, a first dinette mode, an alternate dinette mode, and a chaise lounge mode.

In confined living quarters, such as, but not limited to recreational vehicles, boats, and park model trailers, space is limited and at a premium. Accordingly, it is desirable if existing space and accommodations can be rearranged to use for more than one purpose. For instance, it has been known to provide dinette arrangements, which may be convertible to a sleeping surface. Further uses or arrangements would greatly enhance the utility of such a multiple use arrangement in a living space of limited area.

SUMMARY OF THE INVENTION

In one embodiment of the invention, a convertible seating and dinette arrangement is provided that includes moveable and adjustable first and second seats with each seat including a base, a seat bottom, and a backrest; and wherein each base is configured for pivotal movement to adjust between various modes. The convertible seating and dinette arrangement may also include a footrest attached to at least one of the seats.

The footrest may be adjustable between a position perpendicular to a floor in which the seats are located to an elevated position where a bottom end of the footrest is away from the floor. The footrest may be adjustable to an approximately horizontal position. The footrest may support an end of the seat bottom to which it is attached.

The convertible seating and dinette arrangement can include seats that are moveable and convertible to at least three different modes. One of the modes can be a sofa mode wherein the seats are axially aligned, facing in the same direction and adjacent one another alongside ends thereof.

Another of the modes can be a recliner mode wherein the seats are aligned with one another and facing in the same direction, and side ends of the seats are adjacent one another, and at least one of the seats has a seat back, headrest, and/or footrest reclined at an angle from the perpendicular.

Another of the modes can be a daybed mode wherein the seats are aligned with one another, facing in the same direction, with side ends adjacent one another, and the backrests are reclined to a generally horizontal position.

Another of the modes can have the seats positioned in a dinette mode facing one another with the axes of the seats spaced apart and parallel to one another. The dinette mode can further include a table. The table can be a Murphy style table, moveable between a vertical closed position being stored in a wall and an open use position wherein the table is generally horizontal and located between the seats.

Yet another mode of the convertible seating and dinette arrangement can be an alternate dinette mode wherein axes of the seats are pivoted to be at an angle to one another and the table.

An additional mode of the convertible seating and dinette arrangement can be a chaise lounge mode such that the seats are facing one another and front edges of the seat bottoms are adjacent one another. In the chaise lounge mode, at least one of the backrests can be in an approximately horizontal position and the other backrest can be at an angle to the vertical. The chaise lounge mode can include footrests that are adjacent one another and support front ends of the seat bottoms.

The convertible seating and dinette arrangement may also include at least one removable armrest and may have at least one outer armrest and an inner armrest located above adjacent side edges of the seats. The armrests may include beverage holders and a storage means.

In another aspect of the invention, a movable table and wall arrangement is provided that includes a wall; and a table attached at one end thereof to the wall and movable from a closed vertical orientation parallel to the wall to an open horizontal orientation perpendicular to the wall.

The wall may include a recess for receiving the table in the closed vertical position. The table may include projections extending from sides thereof and the wall may include slots for receipt of the projections, wherein the projections can move up or down in the slots as the table is moved between the closed vertical position and the open horizontal position.

The movable table and wall arrangement may also include at least one support attached to the wall and to the table. The support can be pivotally connected to the wall at a bottom end of the recess and to a bottom side of the table.

The movable table and wall arrangement can further include a leg support extending between a bottom side of the table and a surface below the table.

BRIEF DESCRIPTION OF THE DRAWINGS

The above-mentioned and other features and objects of this invention and the manner of obtaining them will become more apparent and the invention itself will be better understood by reference to the following description of embodiments of the present invention taken in conjunction with the accompanying drawings, wherein:

FIG. 3 is a perspective view of the convertible seating and dinette arrangement in a recliner mode showing a section of the sofa back reclined with the footrest down;

FIG. 4 is a plan view of the convertible seating and dinette arrangement of FIG. 3 in the recliner mode;

FIG. 11 is a perspective view of the convertible seating and dinette arrangement in an alternate dinette mode with seats at an angle to the table;

FIG. 12 is a plan view of the convertible seating and dinette arrangement in the alternate dinette mode;

Figure 1:
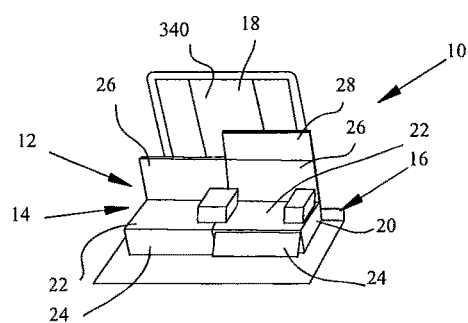
FIG. 1 is a perspective view of one embodiment of a convertible seating and dinette arrangement of the subject invention shown in a sofa mode.

Corresponding reference characters indicate corresponding parts throughout the several views. Although the drawings represent embodiments of the present invention, the drawings are not necessarily to scale and certain features may be exaggerated in order to better illustrate and explain the present invention. The exemplification set out herein illustrates embodiments of the invention, and such exemplifications are not to be construed as limiting the scope of the invention in any manner.

DETAILED DESCRIPTION OF EMBODIMENTS OF THE INVENTION

For the purposes of promoting an understanding of the principles of the invention, reference will now be made to the embodiments illustrated in the drawings, which are described below. It will nevertheless be understood that no limitation of the scope of the invention is thereby intended. The invention includes any alterations and further modifications in the illustrated devices and described methods and further applications of the principles of the invention, which would normally occur to one skilled in the art to which the invention relates.

Referring now to FIG. 1, a convertible seating and dinette arrangement is shown generally indicated as 10. Arrangement 10 is designed to be converted into multiple modes in order to maximize the living quarter space in which it is contained to allow for a variety of uses.

Figure 2:
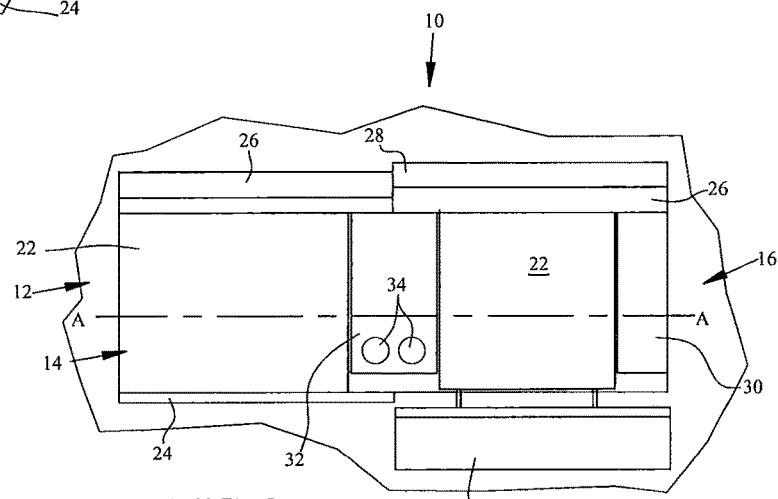
FIG. 2 is a is a plan view of the convertible seating and dinette arrangement in the sofa mode with a footrest elevated.

In FIGS. 1 and 2, arrangement 10 is shown in a sofa mode generally indicated as 12. Arrangement 10 includes a pair of seats, generally indicated as 14 and 16. Seats 14 and 16 are shown placed in front of a wall 18, which forms part of a living quarters, such as in a recreational vehicle or boat, for example. Seats 14 and 16 each include a base or foundation 20, a seat bottom 22, a foot portion or rest 24, and a back portion or rest 26. In the embodiment shown, seat 16 also includes a head portion or rest 28 extending upward from back portion 26.

It should be appreciated that foundations 20 can be mounted on a frame to allow sliding and pivotal movement using known frame members. The movement may be done manually or through motorized means. Alternately, it should be appreciated that foundations 20 may just be placed on the floor of the living quarters and manually moved to position. In the sofa position shown in FIGS. 1 and 2, base portions 20 of seats 14 and 16 are axially aligned with one another "A" so that seats 14 and 16 face outward in the same direction from wall 18 and are adjacent one another to form a sofa as shown. In the embodiment shown, footrest 24 of seat 16 is movable from a position adjacent base 20 to an elevated position at an angle to seat bottom 22 as shown in FIGS. 1 and 2 to allow a user to elevate their feet while sitting in seat 16. Of course, footrest 24 on seat 14 may also be elevatable.

In the embodiment shown, arrangement 10 may also include a removable outer armrest 30 and intermediate armrest 32. The armrest may be temporarily attached using hook and loop fasteners or other well-known means of temporary attachment. Armrest 32 is shown including cup holders 34, which may also be included on armrest 30. It should be appreciated that the arrangement and number of cup holders may be varied and that the armrests may also include a pouch or a compartment for storing such items as a remote control or magazines. It should be further appreciated that an armrest may also be provided on the outside of seat 14.

Now referring to FIGS. 3 and 4 convertible seating and dinette arrangement 10 is shown in a recliner mode, generally indicated as 112. In recliner mode 112, base portions 20 are set in the same position as in the sofa mode with the base portions being axial aligned to have seats 14 and 16 together and facing outwardly from wall 18. However, backrests 26 have been reclined backwards as well as headrest 28 to allow a user to also recline backwards. Additionally, footrest 24 on seat 16 has been further elevated to an approximately horizontal position to allow greater elevation of a user's feet. It should also be appreciated, that should it be desired to allow additional room for reclining backrests 26 and headrest 28, base members 20 may be slid farther outward from wall 18.

Figure 5:
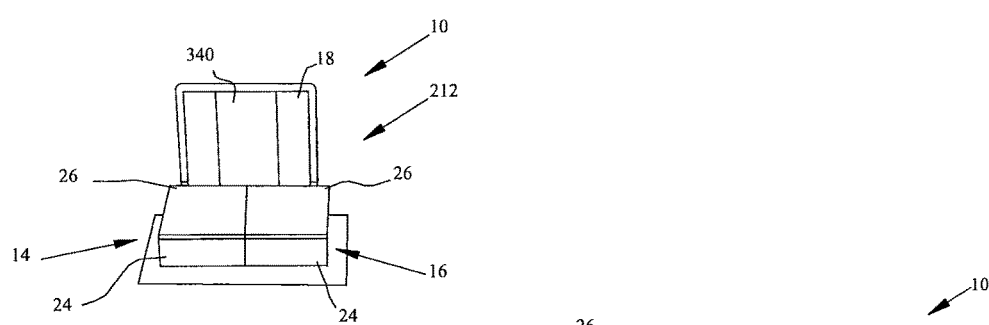
FIG. 5 is perspective view of the convertible seating and dinette arrangement in a daybed mode with all cushions in a flat position.
Figure 6:
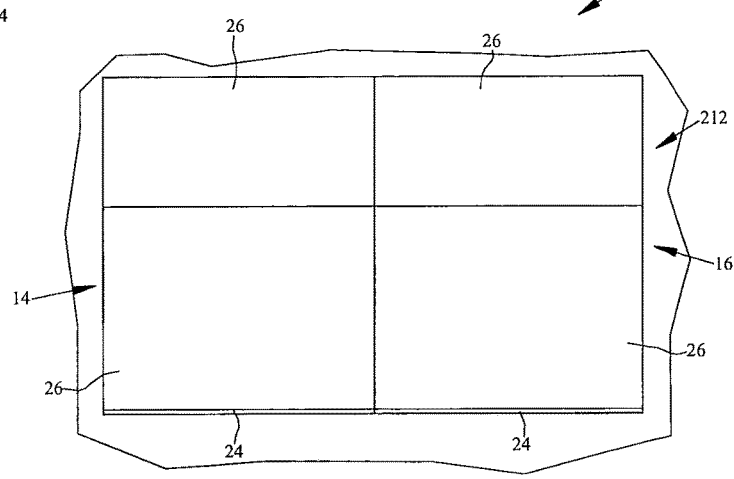
FIG. 6 is a plan view of the convertible seating and dinette arrangement in the daybed mode.

Now referring to FIGS. 5 and 6, the convertible seating and dinette arrangement 10 is shown in a daybed mode, generally indicated as 212. In daybed mode 212, foundations 20 are also kept aligned with one another so that seats 14 and 16 face in the same direction and are adjacent one another; however, foundations 20 are slid out farther from wall 18 to allow backrests 26 to be positioned horizontally and in the same plane as seat bottoms 22 to form a flat bed surface. Note, in the embodiment shown, headrest 28 has been removed from seat 16; however, headrest 28 may also alternately be pivoted up for use as a pillow or rest adjacent wall 18. It should also be appreciated that headrest 28 may be folded downward to provide additional support to backrest 28. Also, brackets or other supports may be mounted to wall 18 or to the floor for supporting backrests 26 in the daybed mode.

Figure 7:
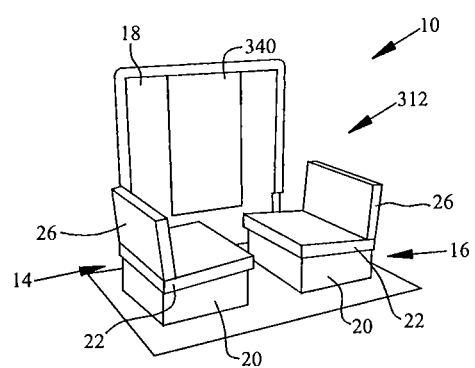
FIG. 7 is a perspective view of the convertible seating and dinette arrangement in a dinette mode and with the table in a closed or non-use position.
Figure 8:
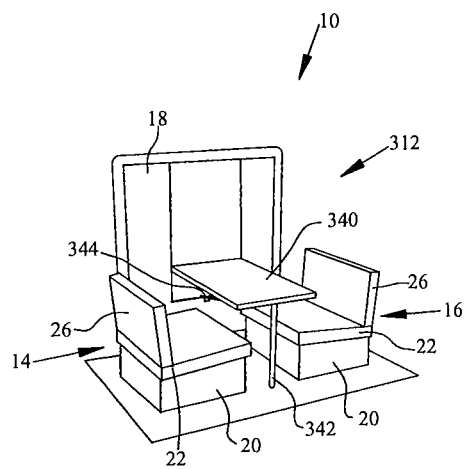
FIG. 8 is a perspective view of the convertible seating and dinette and arrangement in the dinette mode with the table in an open or use position.
Figure 9:
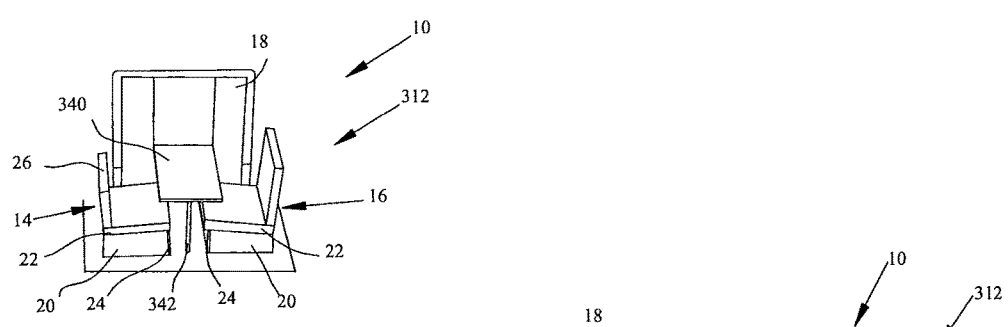
FIG. 9 is another perspective view of the convertible seating and dinette arrangement in the dinette mode with the table open.
Figure 10:
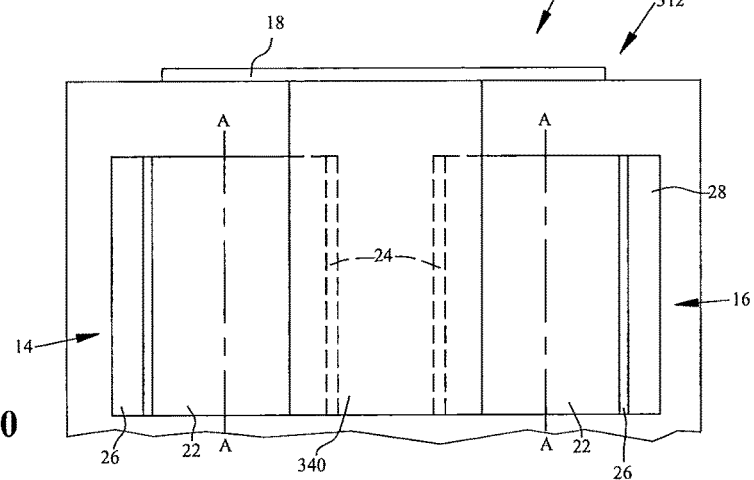
FIG. 10 is a plain view of the convertible seating and dinette arrangement in the dinette mode with the table in the open position.

Now referring to FIGS. 7-10, the convertible seating and dinette arrangement 10 is shown in a dinette mode, generally indicated as 312. In the dinette mode, foundations 20 are pivoted 90 degrees to face one another so that seats 14, 16 are now perpendicular to wall 18 rather than aligned together and facing away therefrom. The axes "A" of seats 14 and 16 are parallel to one another and spaced apart in this mode. In the embodiments shown, arrangement 10 in dinette mode 312 includes a table 340, which may be a Murphy-style table, and folds up to a non-used or closed position as shown in FIG. 7, or alternately, lowered as shown in FIGS. 8-10 to provide a table between seats 14 and 16. In FIGS. 7 and 8, footrests 24 may be removable and are shown removed from seats 14 and 16. Alternately, as shown in FIGS. 9 and 10, footrests 24 may remain in place and adjacent foundations 20.

Figure 16:
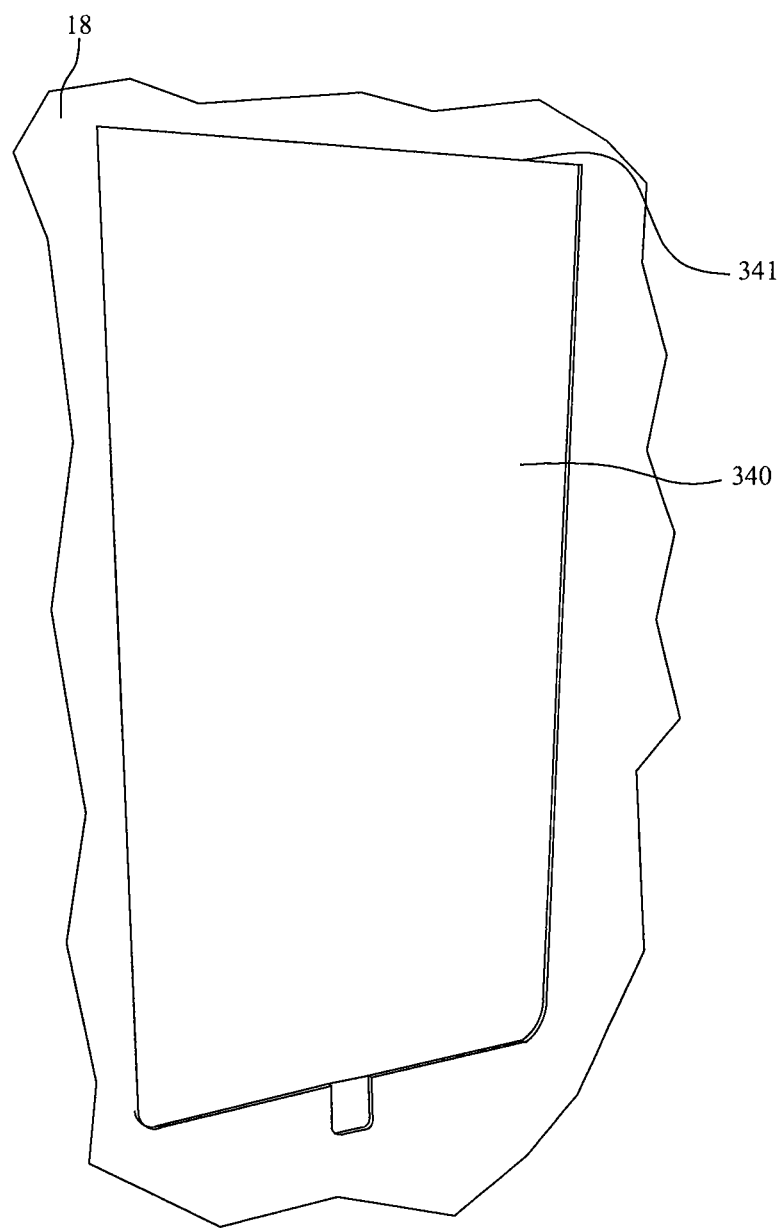
FIG. 16 is an enlarged perspective view of the table in the closed or non use position.
Figure 17:
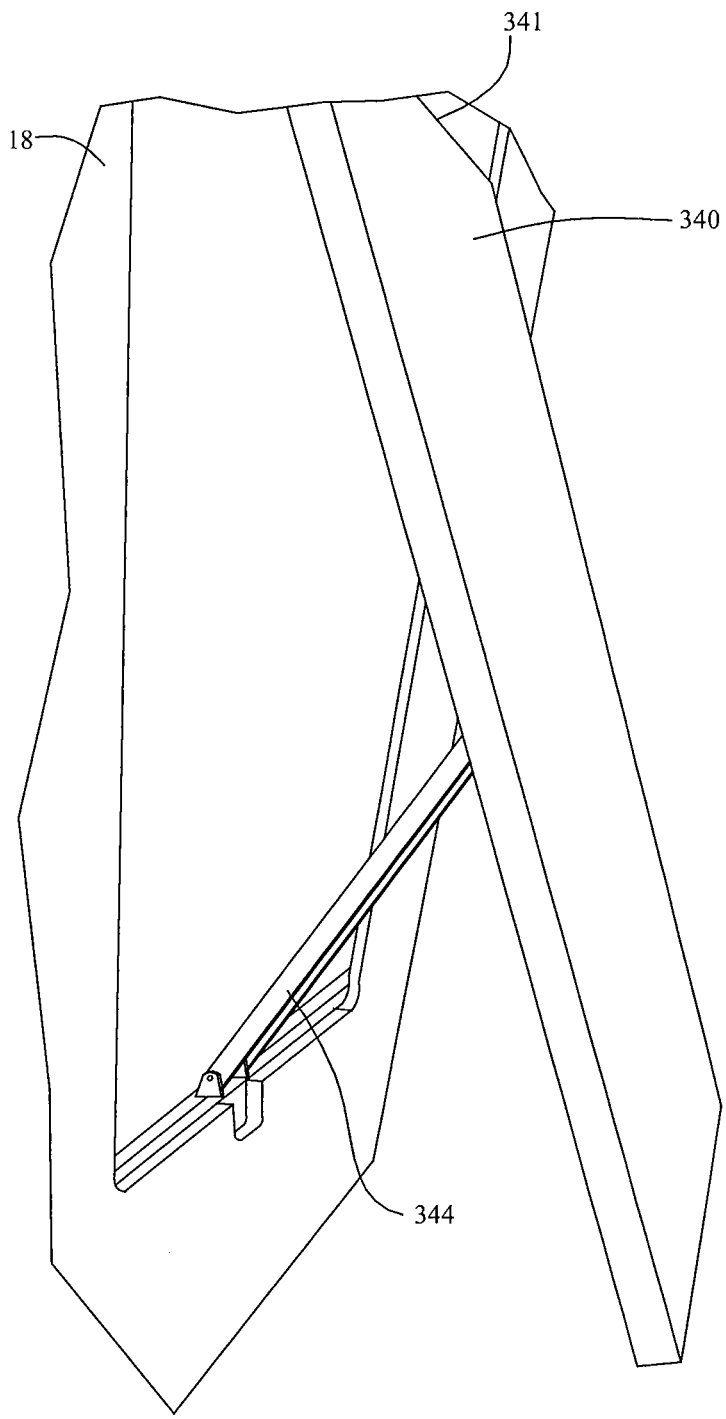
FIG. 17 is an enlarged side perspective view of the table being moved from the closed position to the open use position.
Figure 18:
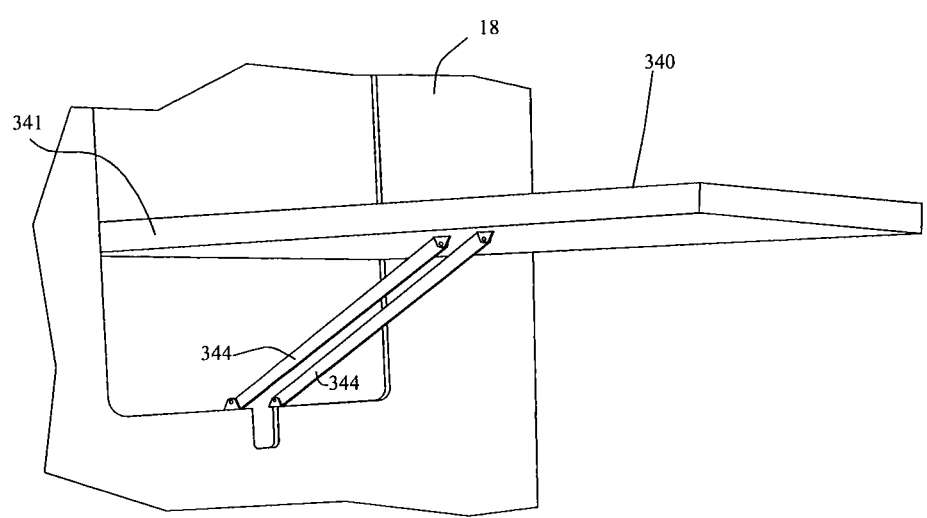
FIG. 18 is an enlarged side perspective view of the table in the open or use position.
Figure 19:
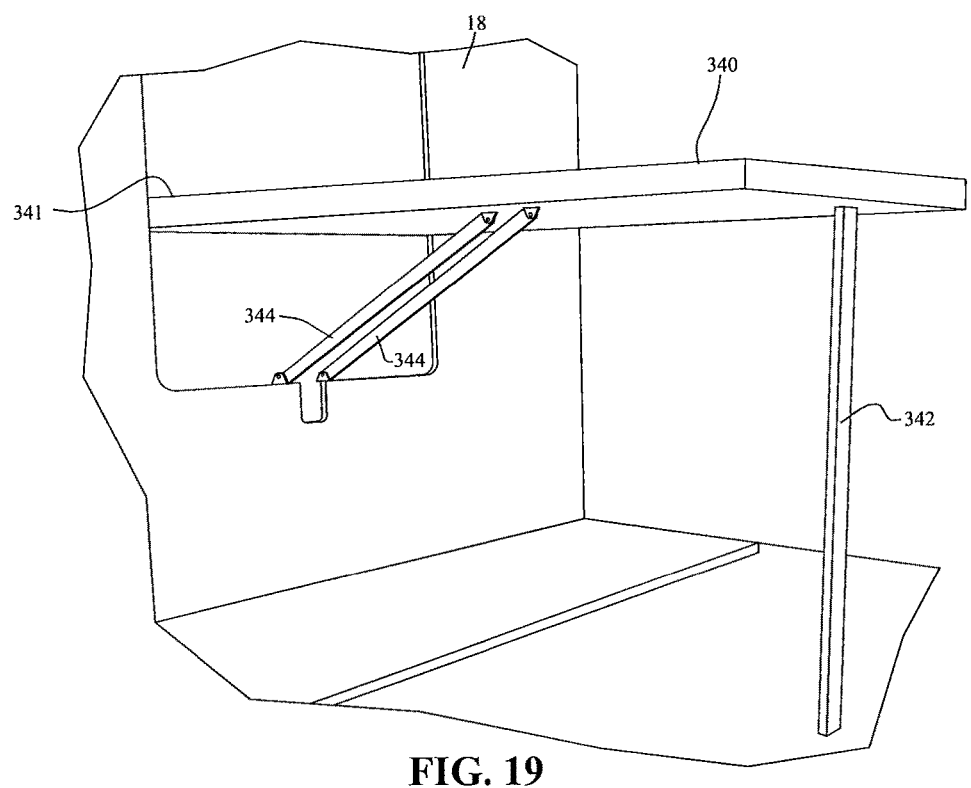
FIG. 19 is an enlarged side perspective view of the Murphy table in the open or use position and supported by a leg brace.

Table 340 may include pins or other alignment means extending from sides of the table at an end 341 that remains attached to wall 18 to allow the back of the table to slide downwardly in slots or tracks in wall 18 from the closed position of FIGS. 7 and 16 to the in-use position in FIGS. 8-10 and 17-19. Murphy table 340 also includes a vertical leg support for bracing an outer end of table 340 and wall supports 344 to brace the end of table 340 adjacent wall 18. Wall supports 344 may be pivotally attached to table 344 and/or wall 18.

It should also be appreciated that in addition to foundations 20 being rotated 90 degrees toward one another to the position shown in FIG. 7-10, the foundations may also be translated parallel to wall 18 so that seats 14 and 16 are in the best position for use in dinette mode 312.

Now referring to FIGS. 11 and 12, an alternate dinette mode 412 is shown, generally indicated as 412. In alternate dinette mode 412, seats 14 and 16 are rotated on foundations 20 approximately 45 degrees back toward the sofa mode, so that the seats are at an angle to one another and table 340, rather than parallel to. If desirable, foundations 20 may also be translated parallel to or perpendicular to, or somewhere in between relative to wall 18.

Figure 13:
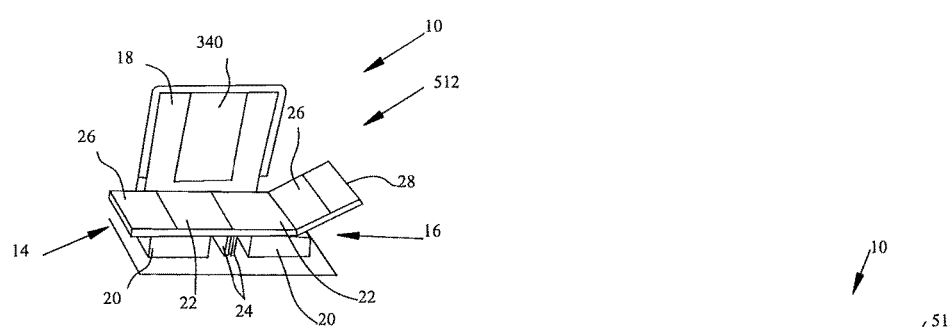
FIG. 13 is a perspective view of the convertible seating and dinette arrangement in a chaise lounge mode.
Figure 14:
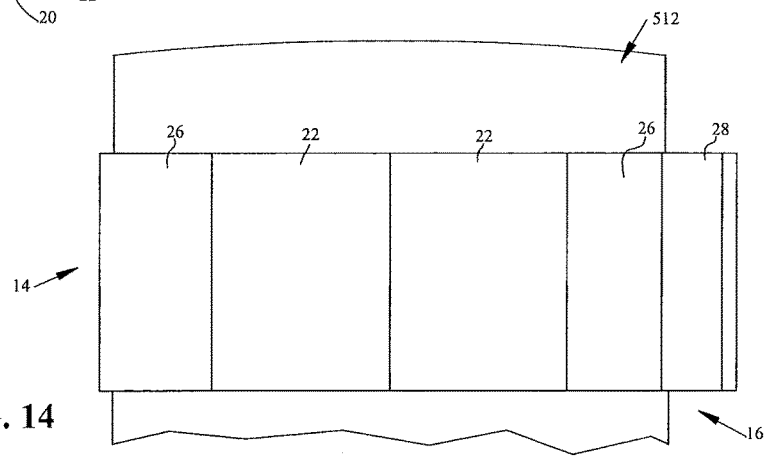
FIG. 14 is a plan view of the convertible seating and dinette arrangement in the chaise lounge mode.

Now referring to FIGS. 13 and 14, convertible seating and dining arrangement 10 is shown, generally indicated as 512 in a chaise lounge mode. In this mode, seats 14 and 16 are facing on another as in dinette mode 312; however, either the foundations 20 are moved closer to one another or seat bottoms 22 are moved relative to foundations 20 so that the leading edges of seat portions 22 abut one another as shown in the figures. In this mode, footrests 24 may serve as supports for the central portion of the seats between foundations 20. Furthermore, backrest 26 of seat 14 is folded down to a horizontal inclination and is parallel to and aligned with bottom portion 22 of seat 14. Backrest 26 and headrest 28 of seat 16 are shown at an angled or inclined position where a user's head and shoulders would rest slightly raised. It should be appreciated that the angle of inclination of backrest 26 and headrest 28 may be adjustable by the user.

Figure 15:
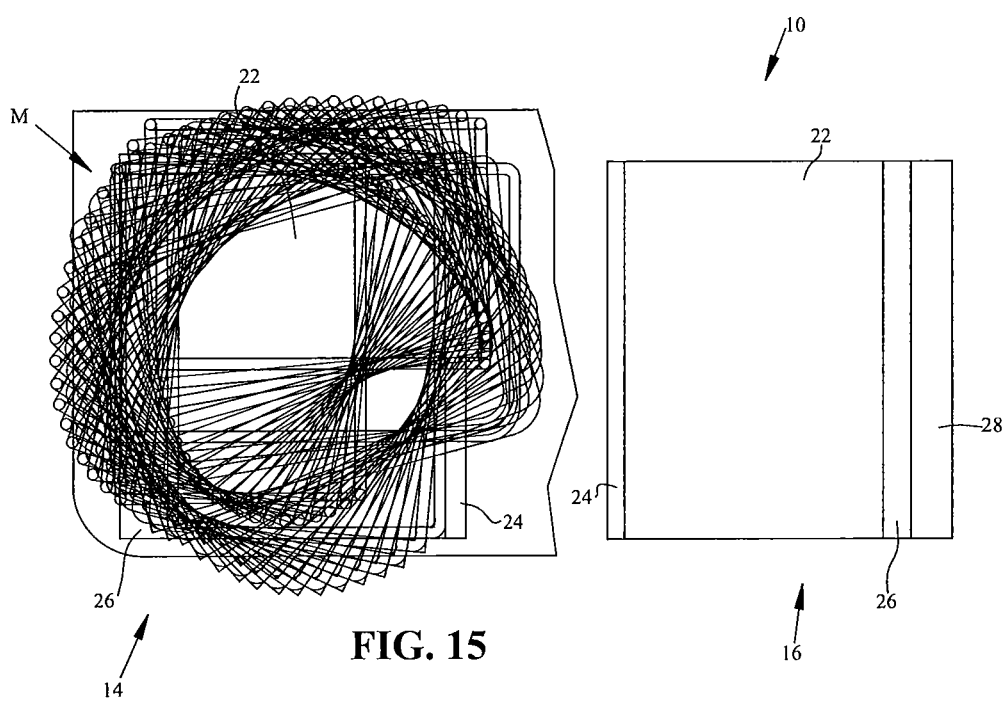
FIG. 15 is a plan view of the seats showing movement one of the seats undergoes in changing between the various modes.

Now referring to FIG. 15, seats 14 and 16 are shown in a plan view as would coincide with dinette mode 312. Additionally, outline movements are shown for seat 14, generally indicated as M, as seat 14 would move and rotate between various modes. Having the movement M, frames for the seats can readily be positioned to accomplish the movement.

Now referring to FIGS. 20-23, an alternate embodiment convertible seating and dinette arrangement is shown generally indicated as 110. In FIGS. 20-23, convertible seating and dinette arrangement 110 is shown in a forward mode, generally indicated as 112(a), which coincides with the general seating position of convertible seating and dinette arrangement 10 in the sofa mode 12/recliner mode 112. Seating and dinette arrangement 110 includes a pair of seats, generally indicated as 114 and 116, respectively. Seats 114 and 116 are shown placed in front of a wall 118, which forms a part of the living quarters, such as in recreational vehicle or boat, for example. Seats 114 and 116 each include a base or foundation 120, a seat bottom 122 and a back portion or rest 126. Seat 114 also includes an extendable foot rest 124, a head rest 128, and moveable arm rests 130 having pivoting arms 132.

Figure 20:
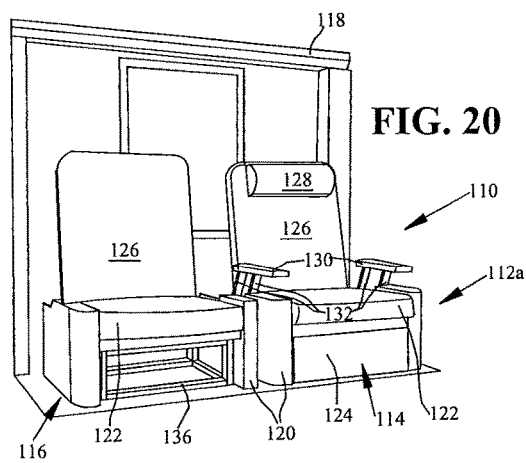
FIG. 20 is a perspective view of an alternate embodiment of a convertible seating and dinette arrangement of the subject invention shown in a forward mode and armrests on one seat in an elevated position.
Figure 21:
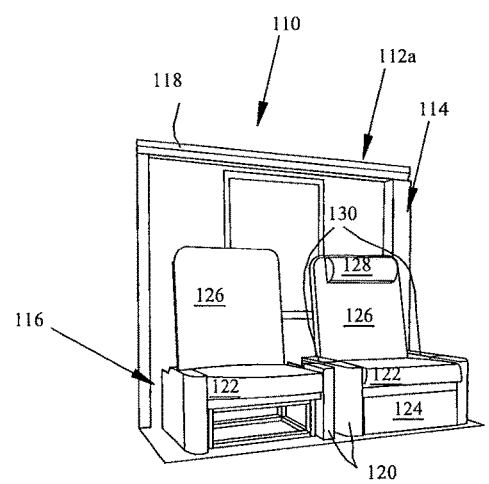
FIG. 21 is a perspective view of the convertible seating and dinette arrangement of FIG. 20 in the forward mode with the arm rests of the seats in a down position.
Figure 22:
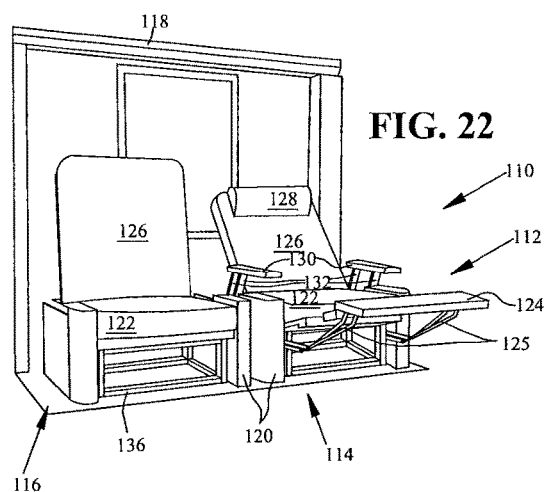
FIG. 22 is a perspective view of the convertible seating and dinette arrangement of FIG. 21 in the forward mode with one of the seats in a reclined position and the foot rest and arm rests in an elevated position.
Figure 23:
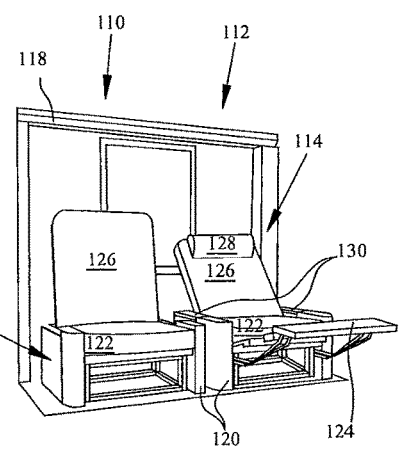
FIG. 23 is a perspective view of the convertible seating and dinette arrangement of FIG. 21 in the forward mode with one of the seats in a reclined position and the foot rest in an elevated position, but the arm rests in a down position.
Figure 24:
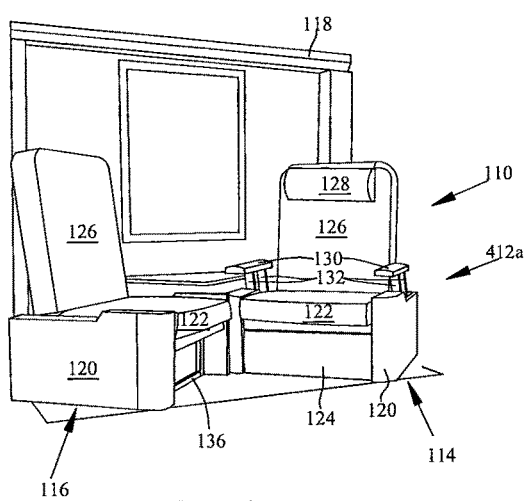
FIG. 24 is a perspective view of the convertible seating and dinette arrangement of FIG. 21 in an angled mode with arm rests of one seat in an elevated position.
Figure 25:
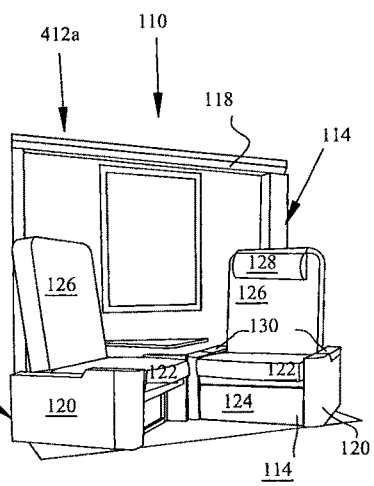
FIG. 25 is a perspective view of the convertible seating and dinette arrangement of FIG. 21 in the angled mode with the arm rests in a down position.
Figure 26:
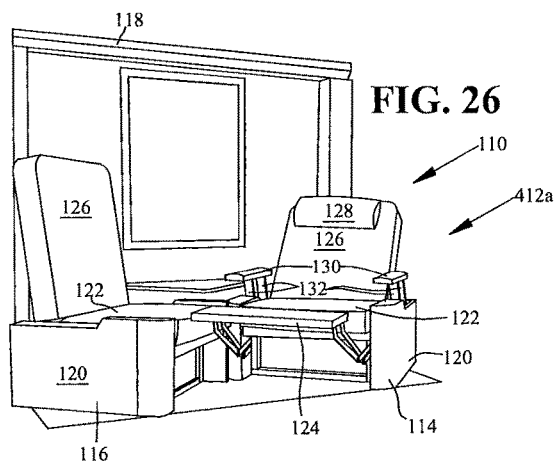
FIG. 26 is a perspective view of the convertible seating and dinette arrangement of FIG. 21 with the seats in the angled mode with one of the seats in the reclined position with the foot rest and arm rests in the elevated position.
Figure 27:
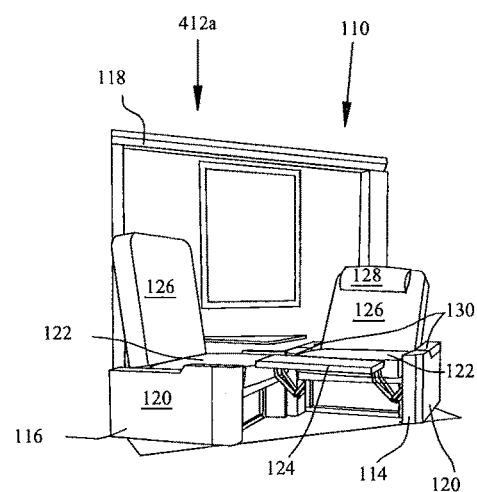
FIG. 27 is a perspective view of the convertible seating and dinette arrangement of FIG. 21 in an angled mode and one seat in the reclined position with the foot rest in the elevated position, but the arm rests in the down position.
Figure 35:
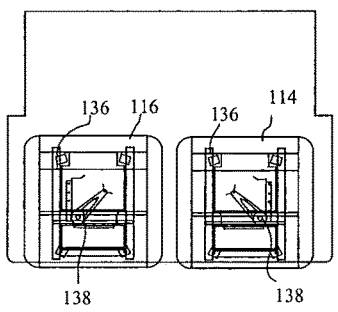
FIG. 35 is a schematic plan view of the seat frames and pivoting mechanisms with the seats in the forward mode.
Figure 36:
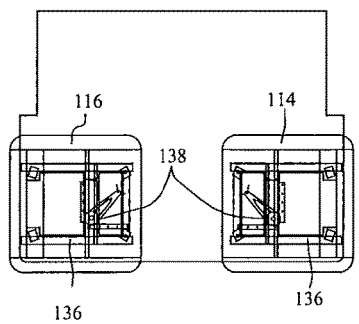
FIG. 36 is a schematic plan view of the seat frames and pivoting mechanisms shown with the seats in the dinette mode.
Figure 37:
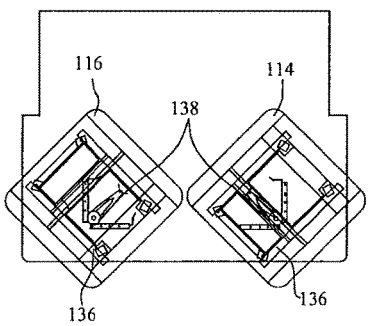
FIG. 37 is a schematic plan view of the seat frames and pivoting mechanisms shown with the seats in the angled mode.

Foundations 120 are mounted on frames 136, which are connected to a pivoting mechanism 138 as best shown in FIGS. 35-37 and discussed further below. In FIGS. 20 and 21, seat back portions 126 are in an upright position and foot rest 124 is in the lowered or non-extended position. However, in FIG. 20, pivoting arm rests 130 are shown pivoted to an upward or elevated position as pivoted on pivoting arms 132, while in FIG. 21, pivoting arms 130 have been lowered or pivoted to a down position. In FIG. 22, arm rests 130 are pivoted to the upward or elevated position. Additionally, seat back 126 of seat 114 is reclined and foot rest 124 is extended on an extending mechanism 125. In FIG. 23, seat back portion 126 is reclined and foot rest 124 is elevated; however, arm rests 130 have been pivoted to a lowered or down position.

Referring now to FIGS. 24-27, seats 114 and 116 have been pivoted on pivoting mechanisms 138 to an angled mode, general indicated as 412a. Otherwise, seat 114 is shown in the same positions regarding reclining or non-reclining of the back rest, the arm rests, and foot rest in FIGS. 24-27 as FIGS. 20-23, respectively.

Figure 28:
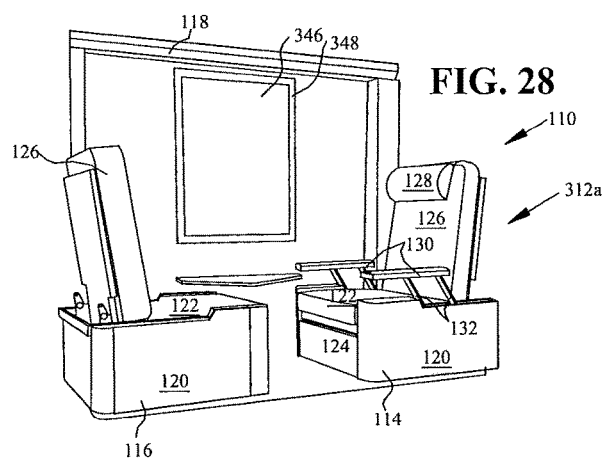
FIG. 28 is a perspective view of the convertible seating and dinette arrangement of FIG. 21 shown in a dinette mode with the arm rests of one seat in an elevated position, but a Murphy dining table in a stored position.
Figure 29:
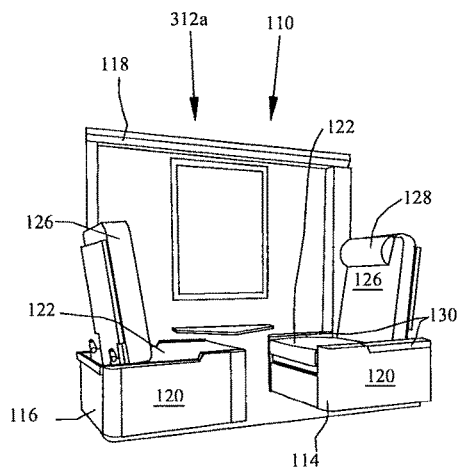
FIG. 29 is a perspective view of the convertible seating and dinette arrangement of FIG. 21 in the dinette mode with the seats in an upright position and the arm rests in a down position and the Murphy table in the stored position.
Figure 30:
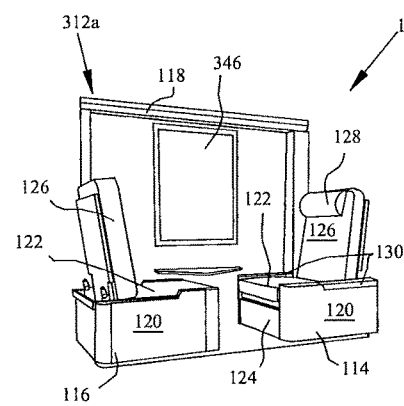
FIG. 30 is another perspective view of the convertible seating and dinette arrangement of FIG. 21 in the dinette mode with the seats in the upright position, the arm rests down, and the Murphy table in a stored position.

Now referring to FIGS. 28-32, seats 114 and 116 have been pivoted on pivoting mechanism 138 to face one another in a dinette mode, generally indicated as 312a. In FIG. 28, arm rests 130 of seat 114 are shown elevated on pivoting arms 132. Additionally, a Murphy table is in a stored position behind a door 346 and contained in a table storage compartment 348. In FIGS. 29 and 30, the Murphy table is still in a stored position; however, arm rests 130 have been pivoted to a down position on pivoting arms 132.

Figure 31:
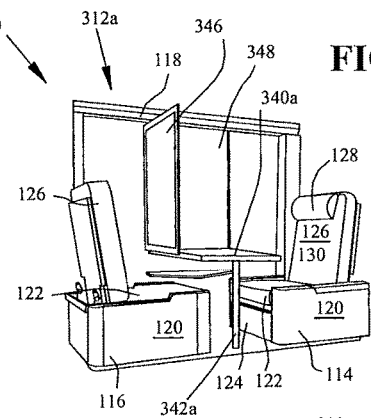
FIG. 31 is a perspective view of the convertible seating and dinette arrangement of FIG. 21 in the dinette mode with the Murphy table in a use position and a door to the table storage compartment open.

FIG. 31 shows a Murphy table 34a being moved to a use position. In this figure, door 346 is shown open so that storage compartment 348 is visible and table 340a has been moved to a horizontal use position. Table 340a is supported by a leg brace 342a.

Figure 32:
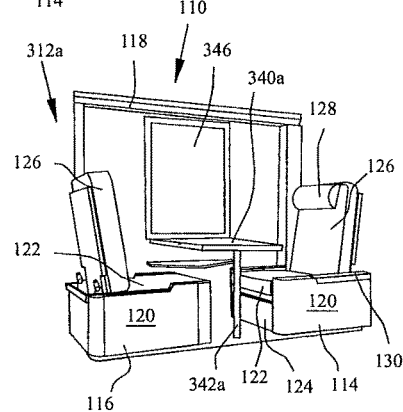
FIG. 32 is a perspective view of the convertible seating and dinette arrangement of FIG. 21 in the dinette mode with the Murphy table in a use position and the door to the table storage compartment closed.
Figure 33:
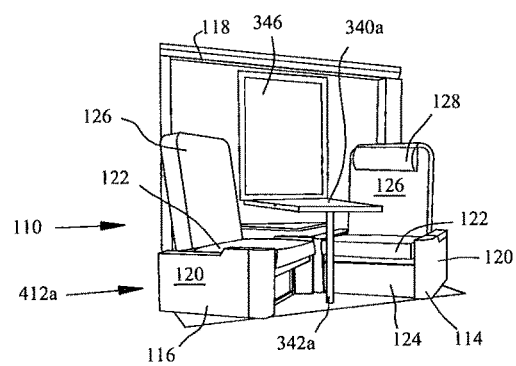
FIG. 33 is a perspective view of the convertible seating and dinette arrangement of FIG. 21 with the seats in the angled mode and the Murphy table in a use position.

In FIG. 32, door 346 has been closed, and seats 114 and 116 face each other for easy ready use in the dinette mode 312a. Now referring to FIG. 33, Murphy table 340a is still in the use position; however, seats 114 and 116 are shown pivoted to the angled mode 412a. This allows the use of the table while the seats have a partial forward position that would be particularly suitable for such activities as viewing a television while having food or beverages on table 340a.

Figure 34:
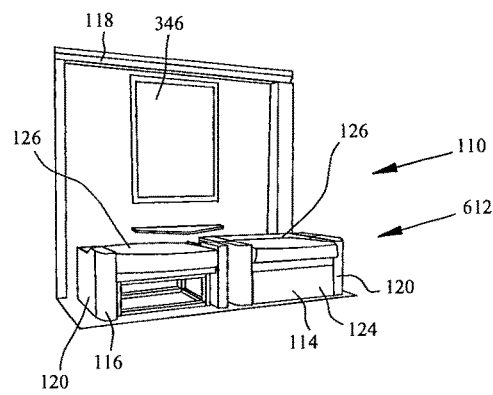
FIG. 34 is a perspective view of the convertible seating and dinette arrangement of FIG. 21 with the seats in a forward position and seat backs folded down to provide a bed mode.

Now referring to FIG. 34, Murphy table 340a has been pivoted up and restored into storage compartment 348, and seats 114 and 116 have been pivoted all the way forward. Additionally, seat back portions 126 have been pivoted downward so that the backs thereof are positioned horizontally. It should be appreciated that seat bottoms 122 and/or head rest portion 128 may be removed from pivoting seats 114 and 116 for this position, which creates a bed mode 612. An additional support and/or cushions (not shown) may be placed upon the backs of seat back portions 126 to enhance bed mode 612 and make more comfortable for sleeping. Seat bottoms 122 may also be placed on the backs of seat back portions 126 for cushioning purposes.

Now referring to FIGS. 35-37, schematic diagrams are shown of pivoting mechanism 138 and how frames 136 of seats 114 and 116 pivot between the various positions/modes discussed above. In particular, pivoting mechanisms 138 include a pivoting roller 139 received in frames 136 and about which seats 114 and 116 rotate or pivot on. As should be appreciated, an indexing or locking feature (such as a biased spring plunger or detent) can be used to keep chairs 114 and 116 oriented in the desired position, until it is desired to further rotate or pivot the seats.

While the invention has been taught with specific reference to these embodiments, one skilled in the art will recognize that changes can be made in form and detail without departing from the spirit and scope of the invention. For example, any of the features in any of the embodiments or modes may be interchanged. Therefore, the described embodiments are to be considered, therefore, in all respects only as illustrative and not restrictive. As such, the scope of the invention is indicated by the following claims rather than by the description.

The invention claimed is:

1. A convertible seating and dinette arrangement including:
    moveable and adjustable first and second seats;
    each seat including a base, a seat bottom, a backrest, and a frame; and
    a pivoting mechanism located beneath each seat, wherein each base is configured for pivotal movement to adjust between various modes, the pivoting mechanisms mounted to a floor and including an arm with a single pivoting roller at an outer end thereof and connected to the frames for pivotal movement along a linear track.

2. The convertible seating and dinette arrangement as set forth in claim 1, further including a footrest attached to at least one of the seats.

3. The convertible seating and dinette arrangement as set forth in claim 2 wherein the footrest is adjustable between a position perpendicular to a floor in which the seats are located to an elevated position where a bottom end of the footrest is away from the floor.

4. The convertible seating and dinette arrangement as set forth in claim 2 wherein the footrest supports an end of the seat bottom to which it is attached.

5. The convertible seating and dinette arrangement as set forth in claim 1 wherein the seats are moveable and convertible to at least three different modes.

6. The convertible seating and dinette arrangement as set forth in claim 5 wherein one of the modes is a sofa mode wherein the seats are axially aligned, facing in the same direction and adjacent one another alongside ends thereof.

7. The convertible seating and dinette arrangement as set forth in claim 5, wherein one of the modes includes a recliner mode wherein the seats are aligned with one another and facing in the same direction, and side ends of the seats are adjacent one another, and at least one of the seats has a seat back, headrest, and/or footrest reclined at an angle from the perpendicular.

8. The convertible seating and dinette arrangement as set forth in claim 5, wherein one of the modes includes a daybed mode wherein the seats are aligned with one another, facing in the same direction, with side ends adjacent one another, and the backrests are reclined to a generally horizontal position.

9. The convertible seating and dinette arrangement as set forth in claim 5, wherein the seats are positioned in a dinette mode facing one another with the axes of the seats spaced apart and parallel to one another.

10. The convertible seating and dinette arrangement as set forth in claim 9, further including a table for use in the dinette mode.

11. The convertible seating and dinette arrangement as set forth in claim 10, wherein the table is a Murphy style table, moveable between a vertical closed position in a wall and an open use position wherein the table is generally horizontal and located between the seats.

12. The convertible seating and dinette arrangement as set forth in claim 5, further including an alternate dinette mode wherein axes of the seats are pivoted to be at an angle to one another and the table.

13. The convertible seating and dinette arrangement as set forth in claim 5, wherein the arrangement includes a chaise lounge mode such that the seats are facing one another and front edges of the seat bottoms are adjacent one another.

14. The convertible seating and dinette arrangement as set forth in claim 13, wherein at least one of the backrests is in approximately horizontal position and the other backrest is at an angle to the vertical.

15. The convertible seating and dinette arrangement as set forth in claim 14, including footrests that are adjacent one another and support front ends of the seat bottoms.

* * * * *